March 20, 1945. C. S. ASH 2,372,047
DUAL WHEEL BRAKE
Filed March 10, 1942 3 Sheets-Sheet 3
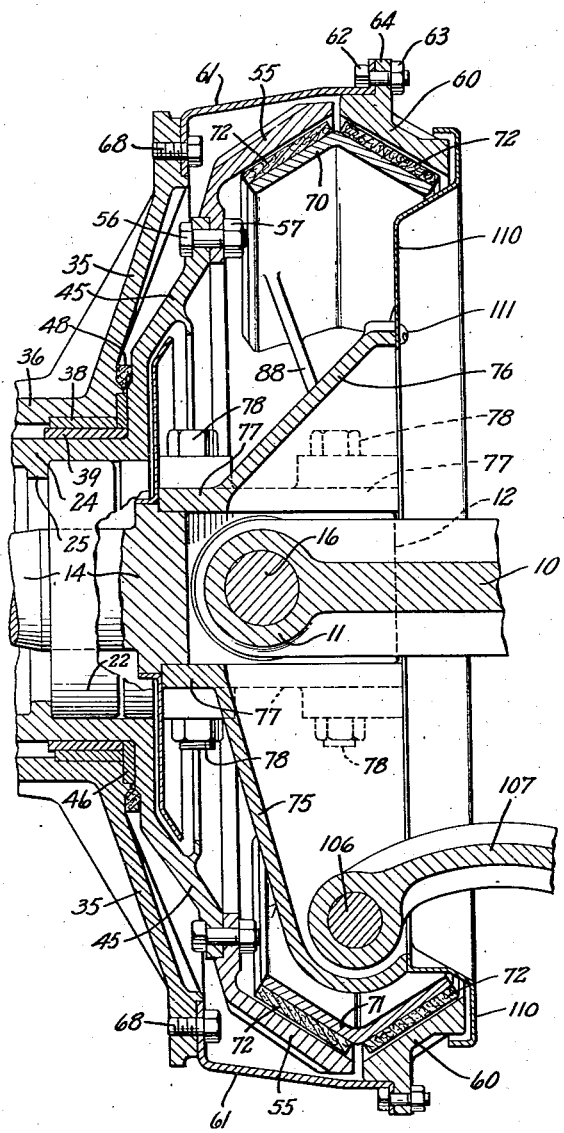
Fig. 3
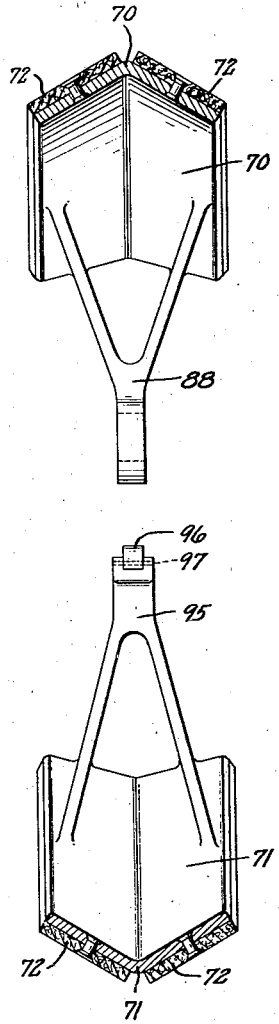
Fig. 4
Fig. 5
INVENTOR
CHARLES S. ASH
BY
ATTORNEY Patented Mar. 20, 1945

2,372,047

UNITED STATES PATENT OFFICE 2,372,047

DUAL WHEEL BRAKE

Charles S. Ash, Milford, Mich.

Application March 10, 1942, Serial No. 434,032

8 Claims. (Cl. 188—18)

The present invention relates to dual wheel assemblies and more particularly to a novel and improved brake mechanism for such assemblies.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part thereof, illustrate one embodiment of the invention, and together with the description, serve to explain the principles of the invention.

Of the drawings:

Fig. 3 is a plan sectional view taken along line 3—3 of Fig. 1;

Fig. 4 is a vertical cross sectional view of a brake shoe for the dual wheel assembly shown in Fig. 1, showing the brake shoe anchoring tongue; and Fig. 5 is another vertical cross sectional view of a brake shoe for the dual wheel assembly taken at a different line on the brake shoe and showing the brake shoe actuating tongue.

Figure 1:
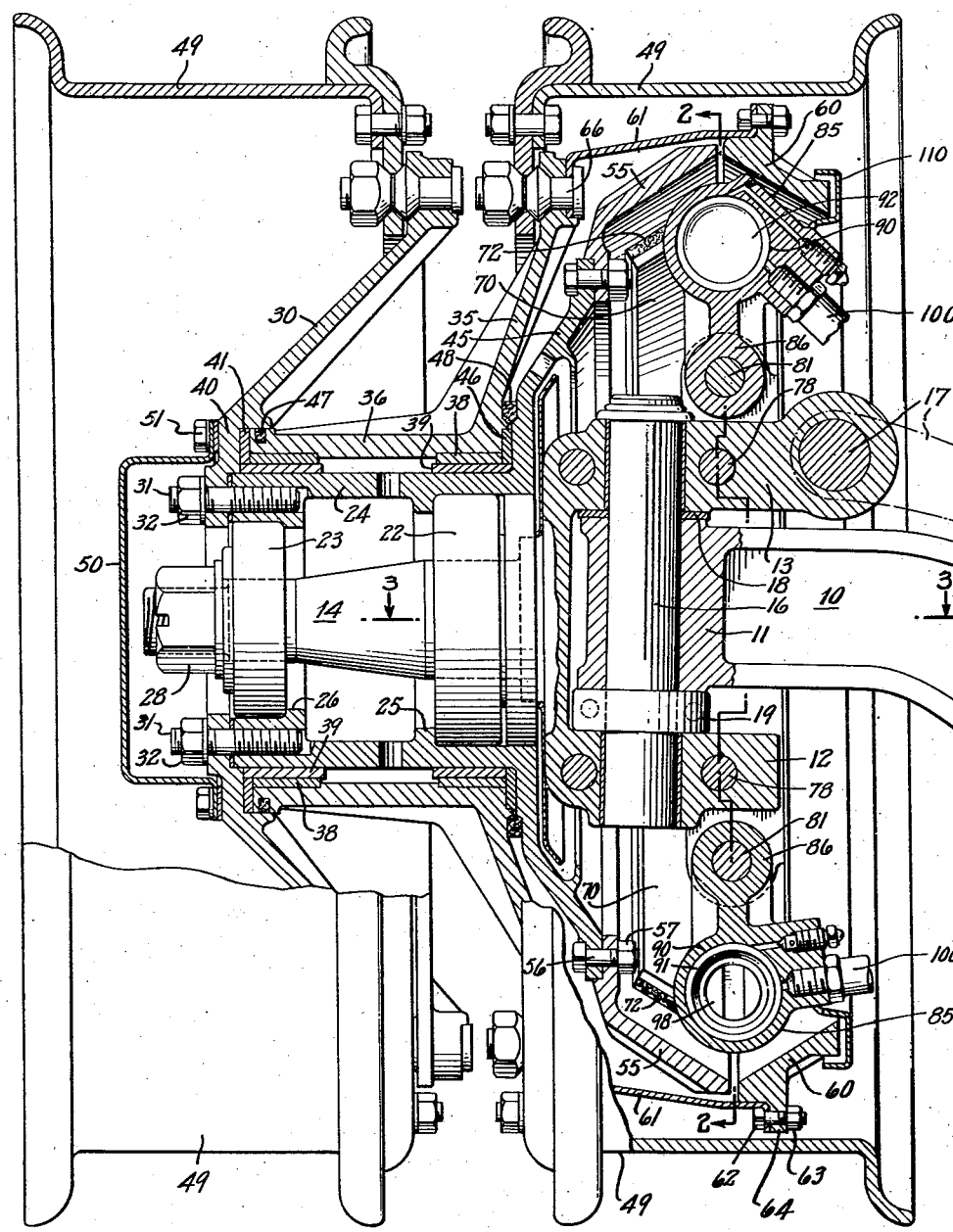
Fig. 1 is a vertical axial sectional view of a dirigible, independently rotatable dual wheel assembly including braking means for the wheels.

The present invention has for an object the provision of a dual wheel assembly for vehicles in which the two wheels of the assembly are free to rotate independently of each other and are provided with adequate, substantial and practical braking means. A further object of the invention is the provision of such braking means for dirigible dual wheel assemblies of the type just mentioned. The present invention provides braking means for each wheel of an independently rotatable dual wheel assembly which are independently acting upon the respective wheels of the assembly but are automatically balanced at all times to exert an equal retarding action when the brakes are being applied. Still a further object is the provision of a safe, sturdy, economical and reliable braking structure for a pair of independently rotatable dual wheels and one which is particularly adapted for use on the front or steering end of a vehicle.

In accordance with the typical and illustrative embodiment of the invention herein described, a wheel spindle is mounted on the end of the front axle of a vehicle by a yoke and king pin assembly for horizontal rotary movement about the axle end in steering the vehicle. The outer wheel of a dual wheel assembly is rotatably mounted upon the spindle by means of an elongated hub and suitable thrust and anti-friction bearings, and the inner wheel of the assembly with a somewhat shorter hub is mounted for independent relative rotation upon the elongated hub of the outer wheel, suitable thrust and anti-friction bearings being provided between the inner and outer wheel hubs.

The braking means for the wheels as herein illustratively described comprise a pair of conical brake members positioned side by side at the inner side of the inner wheel with their respective peripheries of the greater diameter adjacent each other. Each brake member is mounted on one of the wheels for coaxial rotation therewith, the inner member being mounted on a radially outwardly extending annular member integral with the outer wheel hub at its inner end, and the inner member being mounted on the inner wheel by means of a cylindrical member connecting the wheel and the brake member and enclosing the brake member for the outer wheel.

A pair of semi-circular brake shoes of V cross-section are positioned within the brake members and anchored in spaced apart relationship so that the inclined braking surfaces of each shoe may be forced outwardly into frictional contact with the inclined inner surfaces of the two brake members. A pair of brake anchoring and actuating members are provided between the adjacent ends of the semi-circular brake shoes, and each member comprises a pivotal mounting for the adjacent end of one brake shoe and a hydraulic actuating cylinder and piston to exert a force against the adjacent end of the other brake shoe. The brake anchoring and actuating members are pivotally mounted on the spindle yoke arms for pivotal axial movement but are held against rotation, so that the retarding effort of the brake shoes upon the respective conical brake members will at all times be automatically balanced when the brakes are in use due to the ability of the brake shoes to occupy the most effective axial position.

It will be understood that the foregoing general description and the following detailed description as well are exemplary and explanatory of the invention but are not restrictive thereof.

Referring now to the illustrative embodiment of the present invention as shown in the accompanying drawings, a dirigible independently rotatable dual wheel assembly, as shown in Fig. 1, comprises an axle end 10 with the enlarged head 11 which is positioned between the yoke arms 12, 13 integral with spindle 14, washer 18 and roller bearing 19 being interposed between the enlarged end and the yoke arms. A king pin 16 is mounted with suitable bushings in the yoke arms 12, 13 and extends through the enlarged end 11, whereby the spindle 14 is mounted in the usual manner on axle 10 for steering action by means of a suitable steering arm 17 connected to the upper yoke arm 13.

Anti-friction bearings 22, 23 are mounted on the spindle 14 and journalled against the inner cylindrical surface of the elongated outer wheel hub 24, the bearings and hub assembly being maintained in place on the spindle by means of the annular shoulders 25, 26 of the hub to engage bearings 22, 23 respectively, and the nut 28 threaded on the end of the spindle. The inwardly dished outer wheel web 30 is fixed to its hub 24 by means of a plurality of bolts 31 and nuts 32, while the inwardly dished inner wheel web 35 has an integral hub 36 journalled for independent relative rotation upon outer wheel hub 24 with interposed double bushings 38, 39. The outer end of hub 36 is journalled in an enlarged and reinforced portion 40 of the outer wheel web, thrust bearing 41 being interposed, and the inner end of the hub is held against the forces of axial thrust by the radially extending annular brake member carrying member 45 integral with hub 24, and thrust bearing 46 is interposed. Felt lubricant retaining washers 47, 48 are provided at the ends of hub 36 to maintain a lubricant and dust seal for the independently rotatable hubs 24 and 36. The wheel webs 30, 35 are provided with suitable tire carrying rims 49 which may be mounted upon their respective wheels in any known and convenient manner, and a hub cap 50 is secured to outer wheel web 30 by means of cap screws 51.

The braking means provided for the independently rotatable dual wheel assembly comprise a conical brake member mounted on each wheel for independently frictionally retarding the respective wheels and means for exerting balanced frictional force upon the conical brake members. According to the illustrative embodiment shown in the accompanying drawings, a conical brake member 55 for the outer wheel is mounted on the annular brake member carrying member 45 by means of a plurality of bolts 56 and nuts 57, while a second conical brake member 60 for the inner wheel is mounted upon a substantially cylindrical member 61 by means of bolts 62 and nuts 63 which secure the member 61 to an integral annular flange portion 64 provided for the purpose on the brake member. The cylindrical member 61 encloses the outer brake member 55 and is mounted on the inner wheel 35 for coaxial rotation therewith. As illustratively shown in Fig. 1, this mounting may utilize the bolt 66 to secure the cylindrical member to the inner wheel, the bolt also serving to mount the rim 49 on the wheel. The cylindrical member is further secured to the inner wheel 35 by a plurality of cap screws 68 (Fig. 3) the screws being spaced apart about the periphery of the wheel and positioned alternately between bolts 66.

Balanced frictional retarding effort upon the conical brake members 55, 60 is effected by means of a pair of semi-circular brake shoes 70, 71 of V formed cross-section, as shown in Figs. 4 and 5. The outer surfaces of these brake shoes are provided with strips of friction material or brake lining 72 which may be riveted thereto, and the brake shoes are positioned on either side of the axle 10 and adapted, by their combined action, to frictionally engage a major portion of the circumferences of the inclined inner surfaces of brake members 55 and 60 when the brake means are actuated, as hereinafter set forth.

The brake shoes 70, 71 are mounted for balanced braking action upon the yoke arms 12, 13 and as illustratively shown in the accompanying drawings the brake shoe mounting means comprise a triangular, box-like supporting member 75 positioned at one side of the yoke arms, and another triangular, box-like supporting member 76 of somewhat different specific shape positioned at the other side of the yoke arms. Each of the support members 75, 76 is provided with a pair of integral flanges 77 which extend at substantially right angles from the bases of the respective supporting members. The flanges 77 are machined to accurately face the sides of the yoke arms 12, 13 and are affixed thereto by a plurality of bolts 78 extending through transverse borings in the yoke arms and flanges provided for the purpose. The flanges 77 are of sufficient length to cover off the width of the yoke arms 12, 13 and to extend a substantial distance beyond, and are provided at their ends beyond the yoke arms with enlarged and reinforced portions 80. The pins 81 are journalled in suitable circular apertures bored in the enlarged end portions 80 and are removably secured therein by snap rings 82.

Figure 2:
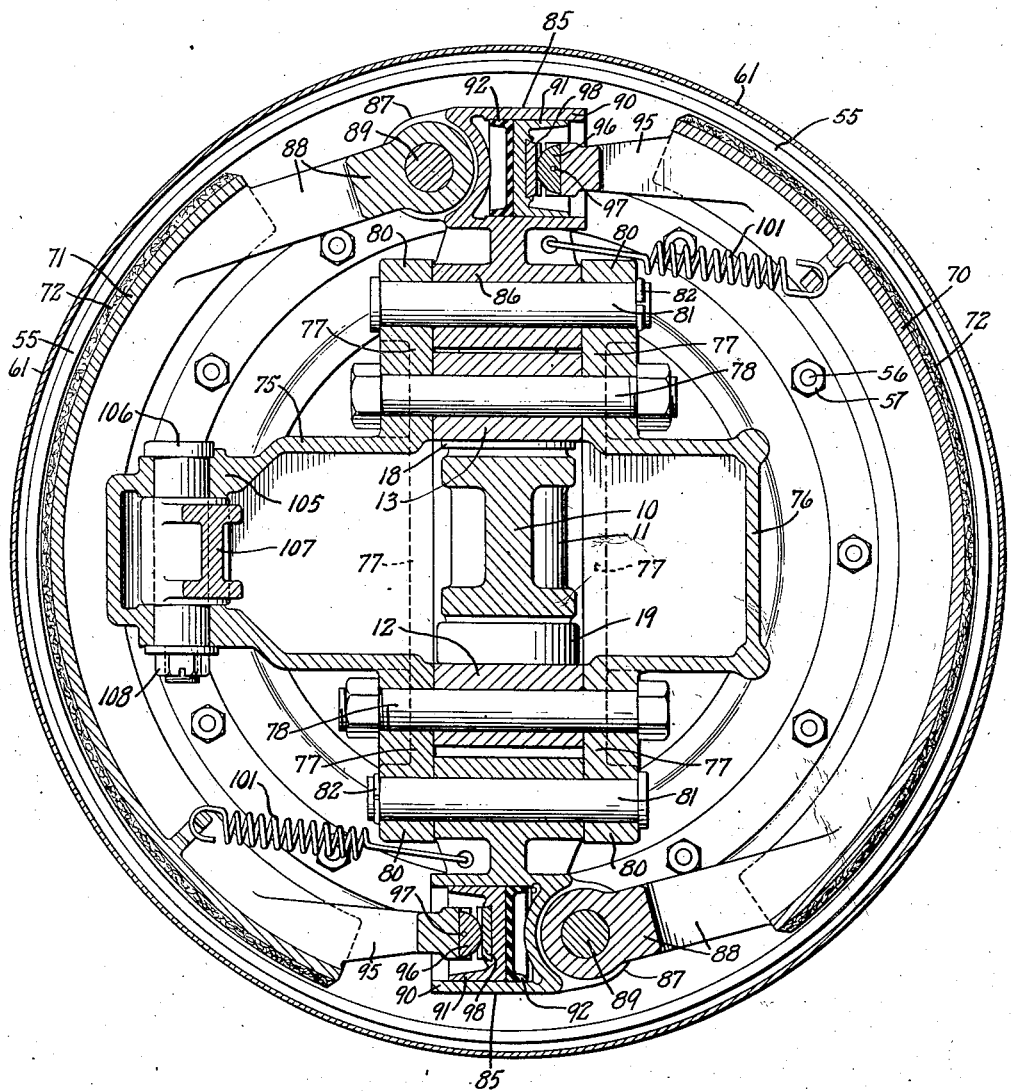
Fig. 2 is a vertical, transverse sectional view taken along line 2—2 of Fig. 1.

The pins 81 form a pivotal support for the brake shoes 70, 71 which insures a balanced individual braking effort upon the independently rotatable dual wheels 30 and 35. As illustratively shown in the accompanying drawings, and referring particularly to Fig. 2, a pair of brake shoe anchoring and actuating members 85 are provided, and these members have the elongated bases 86 with a longitudinal bore therein into which the pin 81 is inserted in assembling the structure. The upper portions of the anchoring and actuating members 85 are formed on one side in integral circular flanges 87 on which the brake shoes 70, 71, are pivotally mounted by means of elongated tongues 88, which are integral with the brake shoes and extend from one end thereof, and pins 89 which are seated in suitable bored apertures in the ends of tongues 88 and flanges 87.

The supporting members 85 are formed at their upper portion on their side opposite flanges 87 into brake actuating chambers 90 in the cylindrical bores of which are positioned brake actuating pistons 91 and cup-like expansible members 92 at the heads of pistons 91 to insure the retention of braking fluid. The ends of brake shoes 70, 71 opposite their ends bearing tongues 88 are provided with similar integral tongue members 95, and these bear at their ends arcuate faced contact members 96 which are removably and replaceably secured in suitable slots in the ends of tongues 95 by pins 97. The arcuate faces of contact members 96 are seated in corresponding grooves extending along the diameter of pistons 85 provided in rectangular inserts 98 of pistons 91. With the described construction it will be apparent that the brake actuating pistons 91 may force brake shoes 70, 71 outwardly about the pivot of pins 89 and simultaneously into contact with conical brake members 55 and 60 for the exertion of braking action on the vehicle wheels, and that the free sliding contact between the tongues 95 and pistons 91 will allow for the pivotal, brake balancing action of the brake anchoring and actuating members 85 about their supporting pins 81. The brake shoes 70 and 71 are located exactly centrally of drums 55 and 60 and in retracted position are very close thereto. When the brake shoes are moved into braking engagement with the conical braking members, the axial movement of the shoes necessary to effectually balance the braking action is on the order of only a few thousandths of an inch. In any practical construction of applicant's invention as shown by the drawings, the tolerances allowed between members 87, 88 and 89 would be more than sufficient to allow the necessary axial movement of the brake shoes.

Suitable and conventional brake fluid tubes 100 are connected to the brake actuating chambers 90 for the actuation of the brakes by hydraulic pressure in the usual manner by the vehicle operator, and retraction springs 101 are connected to the brake bands 70, 71 and the anchoring and actuating members 85 so that the brake shoes will be held out of contact with the brake members 55, 60 until the brakes are to be applied.

The triangular, box-like supporting member 75 is formed at its apex or end away from the yoke arms 12, 13 in a thickened and reinforced portion 105 having the bolt 106 positioned in bored apertures therein for pivotally mounting a conventional tie rod 107 for the wheel assembly, and the bolt is secured in place by a nut 108. An annular protecting plate 110 is affixed with screws 111 to the end or apex of the other triangular box-like supporting member 76 to prevent fouling the brake mechanism with dust and mud.

With the construction shown and described, it will be apparent that the supporting and actuating members 85 and the brake shoes 70, 71 are permitted a certain limited movement axially of the spindle 14 and about pins 81 as pivots, so that when the brakes are applied and the V-shaped brake shoes are forced into contact with the inclined inner surfaces of the conical brake members 55, 60 each of the independently rotatable dual wheels 30, 35 will be independently braked and the braking effort will be at all times equalized and balanced. There is thus removed the possibility of one wheel skidding while the other continues to rotate during the braking process with the attendant dangers of such imperfect braking, and the brake lining material 72 will tend to wear evenly when it contacts the different brake drums 65, 70 and continue the balanced operation of the dual wheel brakes.

The invention in its broader aspects is not limited to the specific mechanisms shown and described but departures may be made therefrom within the scope of the accompanying claims without departing from the principles of the invention and without sacrificing its chief advantages.

What I claim is:

1. In a dual wheel assembly, the combination of an axle, a pair of side by side wheels mounted on the end of the axle for independent relative rotation, a pair of annular inclined brake elements each connected to a wheel for coaxial rotation therewith, a brake member having inclined braking surfaces for frictional engagement with the brake elements, actuating means for moving the brake member into frictional contact with the brake elements, and mounting means on the axle carrying said actuating means and anchoring the brake member against rotation and including a pivotal support for the brake member and actuating means allowing pivotal axial movement of said member and said actuating means.

2. In a dirigible dual wheel assembly, the combination of an axle end, a spindle mounted on the axle end by yoke and king pin assembly for steering movement about the axle end, a pair of side by side wheels mounted on the spindle for independent relative rotation, a pair of annular inclined brake elements each connected to a wheel for coaxial rotation therewith, a brake member having inclined braking surfaces for frictional engagement with the brake elements, means for moving the brake member into frictional contact with the brake elements, and mounting means on the yoke arms of the yoke and king pin assembly anchoring the brake member against rotation and including a pivotal support for the brake member allowing pivotal axial movement of said member.

3. In a dirigible dual wheel assembly, the combination of an axle end, a spindle, yoke arms on the spindle and a king pin on the axle end whereby the spindle is mounted for steering movement about the axle end, a pair of side by side wheels mounted on the spindle for independent relative rotation, a pair of annular inclined brake members each connected to a wheel for coaxial rotation therewith, a brake shoe having inclined braking surfaces for frictional engagement with the brake members, brake shoe anchoring means pivotally connected to one end of the brake shoe, and brake shoe actuating means having sliding engagement with the other end of the brake shoe, said brake shoe anchoring means and brake shoe actuating means being pivotally mounted on the yoke arms for movement axially of the spindle.

4. Brakes for a pair of side by side independently rotatable dual wheels comprising in combination, a pair of side by side annular inclined brake elements each connected for coaxial rotation with a wheel, a brake member having inclined braking surfaces for engagement with the brake elements, means connected to the brake member for holding said member against rotation, and power means engaging the brake member for moving said members into frictional contact with the brake elements, said two last mentioned means being pivotally mounted for pivotal movement axially of the brake elements.

5. In a dual wheel assembly, the combination of a pair of side-by-side, coaxial, independently rotatable, brake members having inclined annular faces, held against substantial axial movement, common brake shoe means mounted for engagement with both of said brake members, a brake anchor and means interconnecting the brake anchor and brake shoe means including a link connected to the anchor by a pivot forming substantially a right angle with the axis of the brake members whereby pressure of the brake shoe means on the brake members may be equalized.

6. In a dual wheel assembly, the combination of a pair of side-by-side, coaxial, independently rotatable brake members having inclined annular faces, held against substantial axial movement, common brake shoe means mounted for engagement with both of said brake members, a brake anchor and means interconnecting the brake anchor and brake shoe means including a link connected to the anchor by a pivot, for preventing substantial rotation of the shoe means while allowing axial movement thereof.

7. In a dual wheel assembly, the combination of a pair of side-by-side, coaxial, independently rotatable brake members having inclined annular faces, held against substantial axial movement, common brake shoe means mounted for engagement with both of said brake members, a pair of brake anchors and means interconnecting the brake anchors and brake shoe means including a link and a pair of parallel pivots at right angles to the axis of the brake members.

8. In a dual wheel assembly, the combination of an axle, a pair of side-by-side wheels mounted on the end of the axle for independent relative rotation, a pair of annular inclined brake elements each connected to a wheel for coaxial rotation therewith, a brake member between the brake elements having inclined braking surfaces for frictional engagement with the brake elements, actuating means for moving the brake member into frictional contact with the brake elements, and mounting means carrying said actuating means and said brake member holding said means and said member against rotation but permitting axial movement thereof.

CHARLES S. ASH.